Sept. 11, 1934.  V. P. NELSON  1,973,540
KNOCKDOWN CANOPY SUPPORT
Filed Feb. 21, 1934
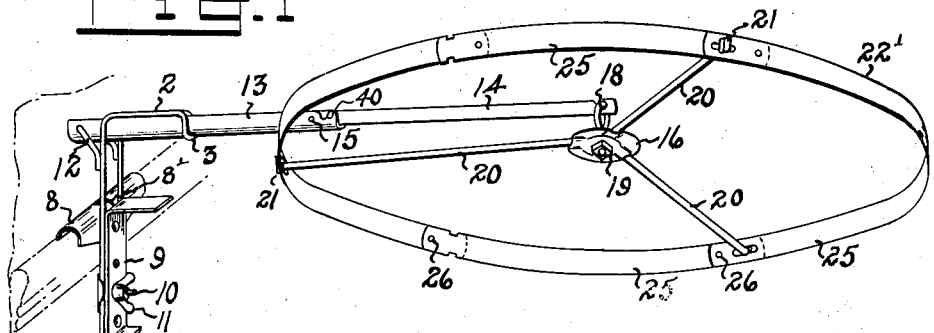
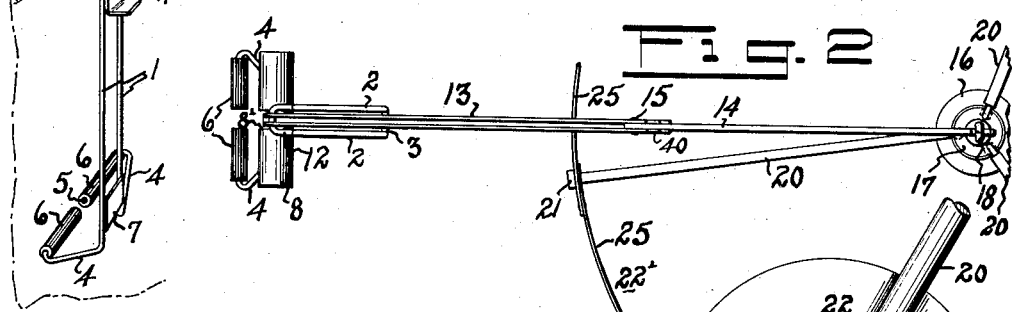
INVENTOR.
Virginia P. Nelson
BY
Darby & Darby
ATTORNEYS.

Patented Sept. 11, 1934

1,973,540

UNITED STATES PATENT OFFICE 1,973,540

KNOCKDOWN CANOPY SUPPORT

Virginia P. Nelson, New York, N. Y.

Application February 21, 1934, Serial No. 712,407

12 Claims. (Cl. 135—5)

This invention involves improvements in canopy supports of a type to be mounted upon the wall over a bed or the like.

The general object of this invention is to provide an improved and simplified form of structure of the knock-down type which, when collapsed, will occupy a minimum of room and which, when put together, will form a simple, strong support to be supported from a wall molding or the like for decorative or utilitarian canopies or hoods.

These and many other objects, as will appear from the following detailed description when taken in conjunction with the drawing, are successfully secured by the structure of this invention.

This invention resides substantially in the combination, construction, arrangement, and relative location of parts in accordance with the description detailed below.

Referring to the drawing—

Figure 1 is a perspective view of the complete device in set up form and applied to a wall molding;

Fig. 2 is a top plan view thereof with a portion of the canopy supporting ring broken away;

Fig. 3 is a side elevational view of the wall bracket in collapsed form;

Fig. 4 is an enlarged top plan view of the ring supporting spider with some parts broken away;

Fig. 5 is a cross-sectional view taken on the line 5—5 of Fig. 4, the arms being in folded position;

Fig. 6 is an enlarged detailed view of the canopy ring; and

Fig. 7 is a plan view of this ring when collapsed.

The device comprises a wall bracket formed of a wire or rod bent into a pair of parallel portions 1 running into a pair of parallel portions 2 extending at right angles thereto and terminating in a downwardly projecting U-shaped portion 3. The portion 3 represents the mid-point of the wire from which the bracket is formed. The other ends of the portions 1 are bent out at right angles, as indicated at 4, and are displaced at approximately an angle of 45° from the plane of the portions 1. The ends of the portions 4 are bent inwardly parallel to the planes of the portion 1 and terminate at opposed adjacent points to form spacing arms 5 which are encased in some suitable resilient material, such as the rubber tubes 6. The lower ends of the portions 1 are rigidly held in spaced relation by means of a small plate 7 which may be secured thereto in any suitable manner, as for example by soldering, abrasing, and the like. At 8 is a suitably shaped supporting arm, likewise secured near the upper ends of the portions 1 in any suitable manner. This arm 8 has a transverse cross-section which, in the form illustrated, adapts it to fit over the top edge of a molding which is indicated in Fig. 1 in dotted lines. Midway of the ends of the arm 8 is a transverse slot 8' for a purpose to be described later.

At 9 is a vertically adjustable brace or bracket which is slidably mounted on the portions 1 and locked at any suitable point by means of the bolt pin and the ring nut 11. When arm 14 is folded back into channel arm 13 the ring 18 can be placed in notch 40 providing, where needed, a shorter arm. At this time the edge of the ring is clamped between brace 9 and arm 13 holding the ring firmly.

Secured near the upper ends of the portions 1 is the U-shaped wire member or support 12 which is attached thereto by soldering, abrasing, or in any suitable manner. Pivotally mounted on the loop 12 is an arm 13 which is in the form of a U-shaped channel, as is clear from Fig. 2. Pivotally attached on the pivot pin 15 near the outer end of arm 13 is a bar 14 having a notch in the end thereof. When the wall bracket is collapsed the bar 14 lies within the channel of the arm 1, as is clear from Fig. 3. Supported in the notch at the outer end of the arm 14 is the canopy ring and its supporting spider.

The spider comprises a disc 16 having a concentric semi-circular groove 16' formed therein, as is clear from Fig. 5. A cooperating plate 17 having an opposed groove 17' is secured to the plate 16 by means of the eyebolt 18 and the locking nut 19. At 20 are the spider arms which, in the form shown, are provided with balls 22 at one end which fit into sockets formed by the annular semi-circular grooves 16' and 17', as is clear from Fig. 5.

At the point of attachment of the arms the plate 17 is radially slotted, as shown in Figs. 4 and 5, to permit of folding of the arms 20 to a parallel position, as indicated in Fig. 5. The outer ends of the arms 20 are provided with heads 21 which may be formed integral with the rods or rotatably mounted therein in any suitable manner. When made integral with the rods, as shown in the drawing, the heads, which are of oblong shape as shown in Fig. 5, may be rotated, for a purpose to be described, by rotating the rods.

A collapsible ring 22 is mounted at the ends of the spider. It consists of a series of sections 25 pivotally connected together by the pivot pins 26. The two end sections are provided with oblong slots 29 through which the head of one of the spider arms 20 will pass. After it has passed through these slots it is turned at right angles so as to lock the ends on the arm. In a similar way the other two arms are attached at spaced points to the ring. At the joints intermediate the points of attachment to the arms, one section is provided with notches 27 at the edges and the cooperating section is provided with projecting ears 28 to lie in the notches. Thus the ring is locked against collapsing and is securely held on the spider arms. It will be noted that the notches 27 and the ears 28 are so placed that when the ring is formed up the sections with the ears are on the inside of the ring so that the tension under which the ring is placed securely holds the ears in the notches.

This simple structure provides a strong and rugged canopy or drapery support when in assembled form, but may be very quickly and easily knocked down into a small, compact article comprising the three parts—the bracket, the spider, and the ring—all of which form small, compact bodies so that the entire structure may be packed away, carried in suit-cases, and otherwise easily stored.

From the above description it will be apparent that this invention resides in certain features of construction which may be readily changed by those skilled in the art without departure from the scope of this invention. I do not, therefore, desire to be strictly limited to the disclosure, as given purely in an illustrative sense, but rather to the scope of the appended claims.

What I seek to secure by United States Letters Patent is:

1. In a canopy, a bracket formed from a rod comprising a pair of parallel portions having rearwardly extending arms at one end and forwardly extending arms at the other end terminating in a downwardly projecting U-shaped loop.

2. In a canopy, a bracket formed from a rod comprising a pair of parallel portions having rearwardly extending arms at one end and forwardly extending arms at the other end terminating in a downwardly projecting U-shaped loop, means for holding the parallel portions in spaced relation, and means for supporting the bracket from the upper end.

3. In a canopy structure, a bracket as described composed of a continuous rod bent at its mid-point to form a pair of parallel portions, the loop at the mid-portion running into a shorter portion extending at right angles to a longer portion, the end of the shorter portion lying at right angles thereto to form a seat, and the longer portion terminating in rearwardly projecting arm portions, an arm pivotally supported on said bracket to rest in the seat, and a collapsible canopy supporting frame detachably mounted at the end of the arm.

4. In a canopy structure, a bracket as described composed of a continuous rod bent at its mid-point to form a pair of parallel portions, the loop at the mid-portion running into a shorter portion extending at right angles to a longer portion, the shorter portion extending into a seat, and the longer portion terminating in rearwardly projecting arm portions, an arm pivotally supported on said bracket so as to rest in the seat, an arm secured to the longer portions for supporting the bracket, and a collapsible canopy supporting structure comprising a foldable spider and a collapsible ring mounted at the outer end of the pivotally supported arm.

5. A structure as described comprising a wall bracket formed of a continuous rod bent back upon itself forming a loop at its mid-point and formed into a long central portion having a short forwardly projecting portion at one end and a short rearwardly projecting portion at the lower end, means for supporting the bracket, an arm pivotally mounted at the top of the bracket and positioned to lie in the loop, a second arm pivotally mounted on the first arm, and a collapsible canopy support secured to the outer end thereof.

6. A structure as described comprising a wall bracket formed of a continuous rod bent back upon itself forming a loop at its mid-point and formed into a long central portion having a short forwardly projecting portion at one end and a short rearwardly projecting portion at the lower end, means for supporting the bracket, an arm pivotally mounted at the top of the bracket and positioned to lie in the loop, a second arm pivotally mounted on the first arm, and a collapsible canopy support secured to the outer end thereof, said collapsible canopy support comprising a collapsible spider and a ring composed of a plurality of sections pivotally mounted together and attached to the outer end of the arms of the spider.

7. A device as described comprising a plurality of arms having elongated heads at one end and balls at the other end, a pair of opposingly grooved discs in which said balls are locked, and means for clamping the discs together.

8. In a canopy supporting structure, the combination comprising a plurality of arms having elongated heads at one end and ball-like members on the other end, a pair of plates having sockets formed therein in which the ball-like members are mounted, means for clamping the plates together, and a ring comprising a plurality of sections pivoted together secured to the ends of said arms by means of the elongated heads.

9. In a canopy supporting structure, the combination comprising a plurality of arms having elongated heads at one end and ball-like members on the other end, a pair of plates having sockets formed therein in which the ball-like members are mounted, means for clamping the plates together, and a ring comprising a plurality of sections pivoted together secured to the ends of said arms by means of the elongated heads, some of said sections having alignable elongated slots adjacent their respective connecting pivot points for receiving said heads and the sections having locking means adjacent the several remaining pivot points.

10. A ring for a structure of the type described comprising a plurality of strips pivotally connected together, and aligning means formed on adjacent sections for locking the sections in parallel relation.

11. In a device as described the combination comprising a rod bent to form a pair of long parallel portions joined at one end, the free ends being bent at an angle to the main portion and the joined end being bent at right angles to the main portion and terminating in a portion lying at right angles thereto and parallel to the main portion, a wire loop secured to the main portion adjacent one end, an arm pivotally mounted on said loop, a collapsible canopy support secured to the outer end of said arm, and means on the main portion for supporting the entire structure from a molding or the like.

12. A canopy support as described comprising a member having one end bent so as to project forwardly thereof and adapted to form a seat and having the other end extending rearwardly thereof to form a spacing member, an arm pivotally mounted on said member so as to rest in said seat, and a framework attached to the outer end of said arm comprising a plurality of radiating arms having a pivotal central support and a sectionalized ring detachably secured to the free ends of said arms.

VIRGINIA P. NELSON.